Patented Jan. 30, 1945

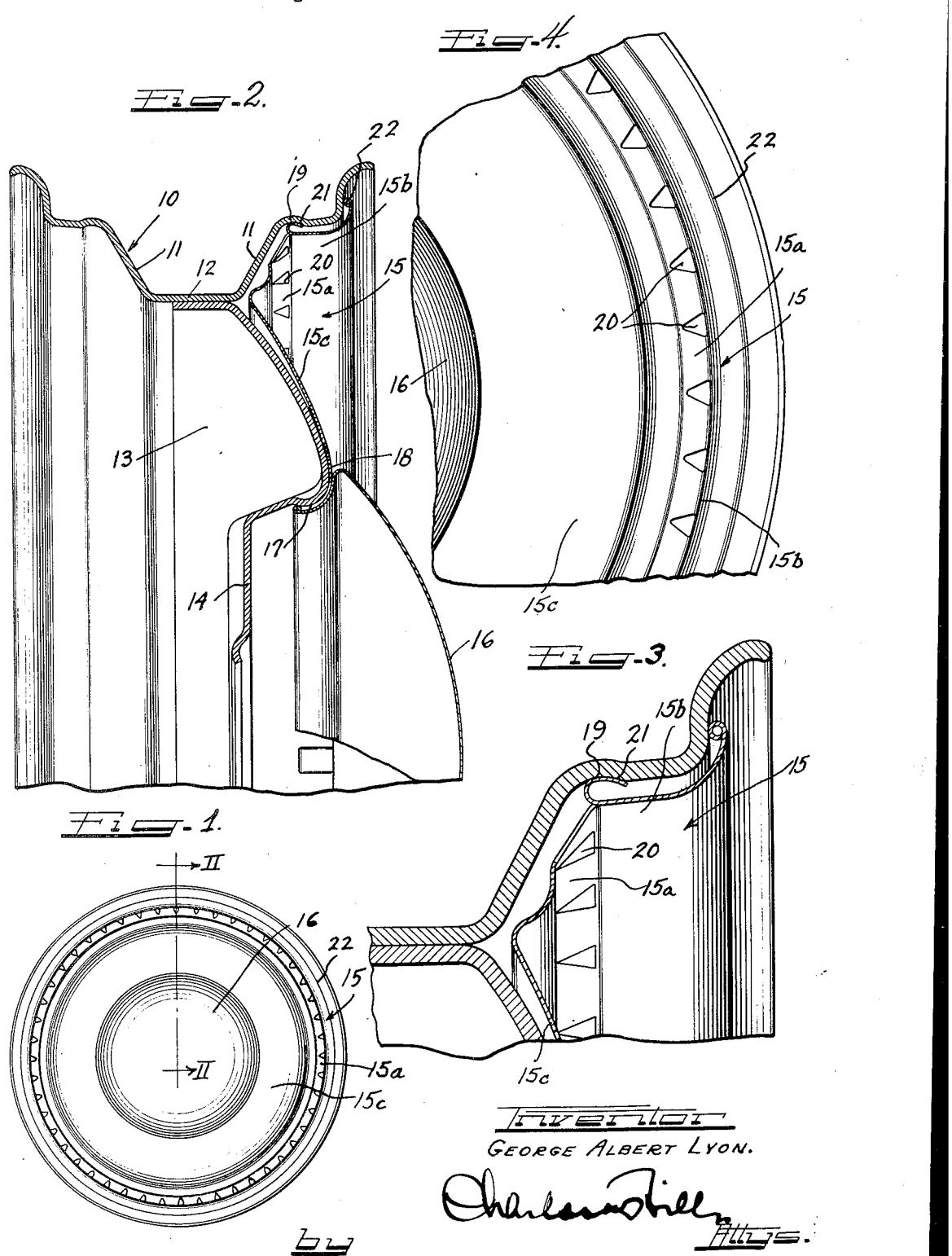

2,368,238

UNITED STATES PATENT OFFICE 2,368,238

WHEEL STRUCTURE

George Albert Lyon, Allenhurst, N. J.

Original application November 25, 1940, Serial No. 366,970. Divided and this application July 2, 1942, Serial No. 449,395

5 Claims. (Cl. 301—37)

This invention relates to a wheel structure, and more particularly to a novel wheel cover adapted to be detachably sprung or snapped into retaining cooperation with a shoulder on the tire rim of a wheel. This application is a division of my copending application Serial No. 366,970, filed November 25, 1940, entitled "Wheel structure."

An object of this invention is to provide a wheel cover of such construction that it lends itself readily to decoration consistent with the appointments of the vehicle wheel to which it is applied.

Still another feature of this invention relates to the forming of the flexible retaining means of the cover in a plurality of radial resilient projections, with their extremities arranged in a common circle of a diameter greater than that of the inner surface of the shoulder on a tire rim.

In accordance with the general features of the invention there is provided herein a wheel structure including a flanged and shouldered tire rim, a wheel cover comprising a one-piece circular member which is provided with an intermediate annular section from which resilient fingers are radially punched and bent back upon the body of the wheel cover to provide for resilient detachable engagement between the cover member and the shoulder on the tire rim.

Still another object of the invention is to provide generally an improved wheel cover construction which embodies novel means for retaining the cover upon the wheel structure and which is so constructed and arranged that it may be manufactured with a minimum of difficulty and at a minimum cost.

Other objects and features of this invention will more fully appear from the following detailed description taken in connection with the accompanying drawing in which:

Figure 1 is a side elevation of a wheel structure embodying a wheel cover of my invention;

Figure 2 is an enlarged fragmentary cross-sectional view taken on the line II—II of Figure 1 looking in the direction indicated by the arrows;

Figure 3 is an enlarged fragmentary cross-sectional view corresponding to the upper right-hand portion of Figure 2 and illustrating clearly the attachment between the wheel cover and the wheel structure; and Figure 4 is an enlarged fragmentary face view of the structure shown in Figure 2.

As will be seen from the drawing, the reference character 10 designates generally a metallic drop center type of tire rim, including a multiple of side flanges 11, as well as a base flange 12. The base flange 12 of the tire rim is connected to the usual wheel body or spider 13, which is of a bulged or convex cross-sectional shape and terminates at its center in the usual wheel fastening or bolt on flange 14.

It is to be understood that while the embodiment shown herein is in the form of an annulus, my invention is not to be thus limited, since it is equally well adaptable to a cover in the form of a disk or the like. These wheel covers may be made from any suitable sheet material, such, for example, as stainless steel sheet, or 18-8 sheet. I have in the past in the manufacture of wheel disks and trim rings obtained excellent results by making them of sheet material of .020" thickness.

The wheel covering member shown in the drawing comprises generally an outer annulus 15 and a central hub cap portion 16. The annulus 15 comprises an intermediate annular section 15a, an outer marginal portion 15b having an outwardly convex cross section and an inner annular marginal spider covering portion 15c.

The hub cap 16 is snapped into retaining engagement with spaced protuberances 17 on the wheel spider 13. The hub cap also engages over and clamps the inner edge 18 of the inner portion 15c of the annulus 15.

The annulus 15 has punched from the intermediate section 15a a plurality of spaced triangular shaped fingers 19 leaving trianguler shaped slots 20 in the cover part through which the color of the wheel rim is visible. The resilient fingers 19 are turned back upon the body of the cover part 15 and are cooperable with shoulder 21 on the flange 11 of the wheel rim 10.

In the application of the annulus 15 to the wheel, it is pressed axially against the wheel and in so doing the fingers 19 are flexed or cammed inwardly so they can pass over and behind the shoulder 21 into retaining cooperation therewith.

The flexible fingers 19 are under resilient stress when they are in engagement with the shoulder 21 on the wheel rim. This is due to the fact that these fingers have been distorted out of their normal position in passing over the shoulder, and when pressed home behind the shoulder, have only partly returned to their normal position, so that they are under tension, or, in other words, under a resilient force tending to move them radially outwardly. It is this resilient pressure of the fingers which is utilized to tightly bind the cover member to the shoulder 21 so the cover member is held under tension on the wheel.

Also, the outer edge of the annulus 15 is reinforced by reason of a bead 22 and this reinforced edge can be utilized in the application of a pry-off pressure to the cover. That is to say, the end of a pry-off tool can be inserted under this beaded edge when it is desired to forcibly eject the cover from the wheel.

It will also be observed that I utilize the rim shoulder 21 in the retaining of the wheel cover on the wheel. This shoulder is formed by bulging an axial flange of the rim and is one of two provided in the rim flanges to prevent slipping or sliding of the tire beads toward the base flange of the rim. Without such shoulders there is a marked tendency of the beads sliding transversely toward the rim base flange when the tire is deflated as by puncturing and thereby occasioning damage to or excessive wear of the tire. Thus these shoulders are employed for a dual function in my novel wheel structure.

What I claim is:

1. In a wheel structure including a flanged and shouldered tire rim, a wheel cover comprising a circular member having an intermediate portion thereof provided with spaced flexible retaining fingers extending radially from said member and turned back upon the main body of the member, said fingers being flexible upon being pressed against a shoulder of said rim so as to be sprung over and behind the shoulder into retaining engagement therewith, said fingers being disposed in an intermediate bent portion of said member.

2. In a wheel structure including a flanged and shouldered tire rim, a wheel cover comprising a circular member having an intermediate portion thereof provided with spaced resilient fingers punched radially from said member and turned back upon the main body of the member, said resilient fingers being flexible upon being pressed against the shoulder of said rim so as to be sprung over and behind the shoulder into retaining engagement therewith, said resilient fingers being disposed in an intermediate bent portion of said member, said shoulder being formed by an annular depression in a flange of said tire rim and defining a tire bead receiving groove for preventing side slippage of the tire bead upon deflation of the tire.

3. In a wheel structure including a flanged and shouldered tire rim, a wheel cover comprising an outer marginal portion having a cross section shaped to conform substantially to the configuration of the adjacent portion of a tire rim, an inner marginal portion having a cross sectional shape to conform substantially to the configuration of the adjacent portion of the wheel structure and an intermediate annular portion bridging said marginal portions, said intermediate portion having resilient fingers punched radially therefrom and turned back upon the outer marginal portion, said resilient fingers being flexible upon being pressed against the shoulder of said rim so as to be sprung over and behind said shoulder into retaining engagement therewith, said fingers being shaped so that the ends thereof are disposed slightly radially inwardly thereby to override said shoulder during a pry-off operation.

4. In a wheel structure including a flanged and shouldered tire rim part and a body part, a wheel cover including an annular trim ring member and a central hub cap portion, said trim ring including an outer marginal portion having a cross section shaped to conform substantially to the configuration of the adjacent portion of the tire rim, an inner marginal portion having a cross-sectional shape to conform substantially to the configuration of the body part and an intermediate marginal portion bridging said inner marginal portion, said intermediate portion having resilient fingers punched radially therefrom and turned back upon the outer marginal portion, said resilient fingers being flexible upon being pressed against the shoulder of said rim so as to be sprung over and behind said shoulder into retaining engagement therewith, said trim ring portion having its inner edge bearing against the outer surface of said body part and being adapted to be retained in this position by engagement of the hub cap thereagainst when the latter is secured to said body part, and the outer edge of said trim ring being beaded and having the bead in bearing relationship to the adjacent outer surface of the rim whereby said trim ring portion is supported by the wheel structure at its inner and outer edges and retained in its supported position by means of said fingers.

5. The structure of claim 1 further characterized by the circular member having a central portion provided with a turned marginal edge for retaining cooperation with a hub cap independent of the retaining action of the fingers.

GEORGE ALBERT LYON.